J. SWARTZ.
MEASURING INSTRUMENT.
APPLICATION FILED JAN. 4, 1919.
1,329,729.
Patented Feb. 3, 1920.
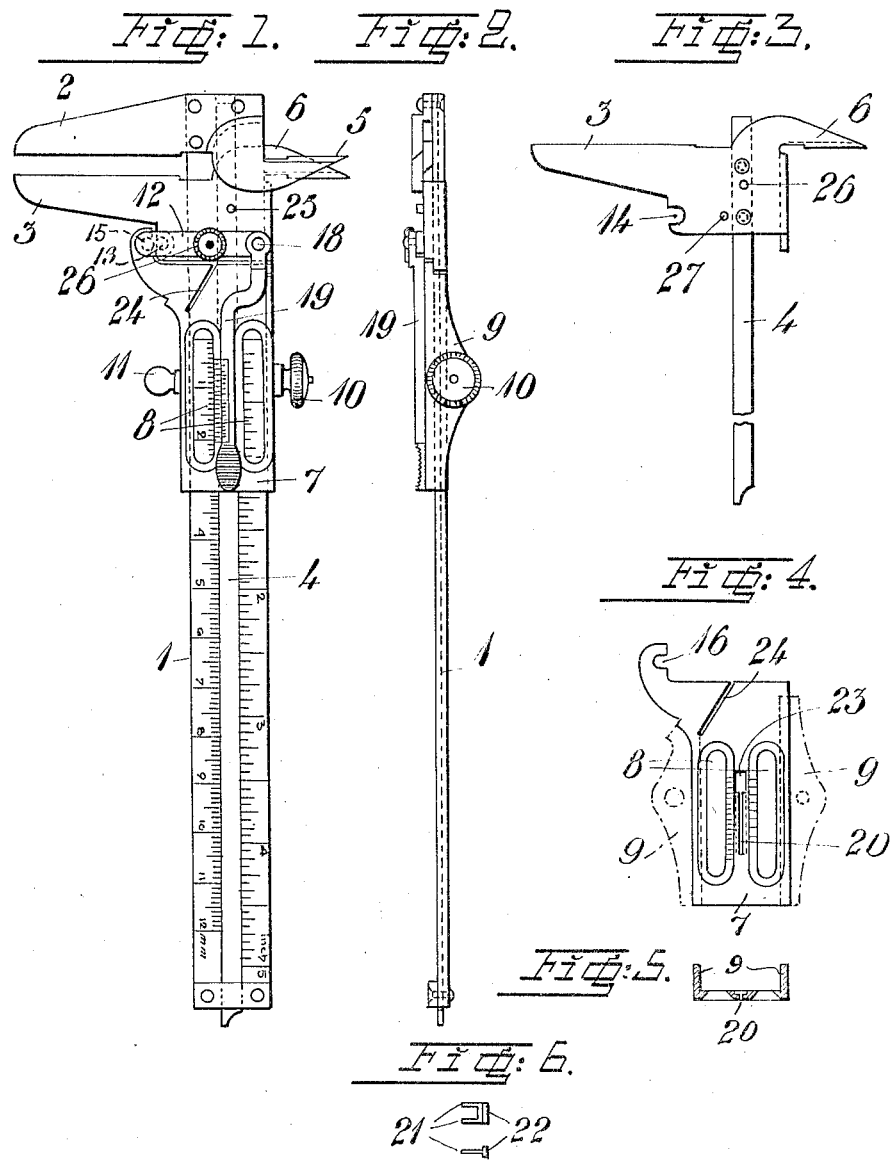

UNITED STATES PATENT OFFICE.

JOHAN SWARTZ, OF HAGALUND, SWEDEN.

MEASURING INSTRUMENT.

1,329,729.   Specification of Letters Patent.   Patented Feb. 3, 1920.

Application filed January 4, 1919. Serial No. 269,566.

*To all whom it may concern:*

Be it known that I, JOHAN SWARTZ, a subject of the King of Sweden, residing at Hagalund, Sweden, have invented new and useful Improvements in Measuring Instruments, of which the following is a specification.

The present invention refers to a measuring-instrument which has a ruler provided with a scale and a jaw, displaceable along the said ruler and a nonius member which is displaceable together with the said jaw for the purpose of reading off the displacement of the jaw in common with the nonius member in relation to which the jaw has also a movement in the longitudinal direction of the ruler, which relative movement can, by means of an auxiliary member, be read off enlarged. The characteristic feature of the invention consists in, that this said auxiliary member, which has a movement governed on the nonius member, is pivotally attached to the longer arm of a double-armed lever pivoted on the jaw, the shorter arm of which said lever being pivotally attached to the nonius member. The advantage gained hereby as compared with earlier known measuring instruments of a similar character is, first, that the instrument in question becomes more reliable in its function, which is evidently of the greatest importance in such instruments, and, secondly, that the instrument becomes more simple in construction and that the various parts thereof can be so arranged that they more easily allow of the employment of the instrument for the execution of several different kinds of measurements. The other arrangements in connection with the invention will be seen by the following description.

An embodiment of the present invention is shown in the annexed drawing. In Figure 1 there is shown a plan of the measuring instrument, and in Fig. 2 it is seen in side elevation. In Fig. 3 there is shown a plan of the displaceable jaw, and in Figs. 4 and 5 the nonius member is seen in plan and transverse section. Fig. 6 are views showing in side and edge elevations the fastening pins 21. Fig. 7 is a top plan view of the lever 12 shown in Fig. 1.

1 is a ruler with scales, and 2 a jaw riveted fast on the said ruler. 3 is a jaw displaceable on the ruler, which said jaw is riveted fast to a rod 4 which moves in a corresponding guide-groove in the ruler and governs the jaw 3 during its displacement along the ruler. The jaws 2 and 3 serve, as usual, for taking outer measurements, the respective projections 5 and 6 on the jaws serve to take the inner measurements, and the rod 4 serves to take depths. 7 is a nonius member displaceable along the ruler with nonius scales on the inner edges of the openings 8, which nonius scales coact with the respective scales on the ruler 1. For clearness, the nonius scale is omitted in Fig. 1 from the inner edge of one of the openings, both being shown in Fig. 4, and likewise in Fig. 1 rod 19 shows but one of its two nonius scales. The nonius member 7 is provided with lateral guide flanges 9 shown by dotted lines unfolded in Fig. 4. Through these flanges there goes a bolt 11 provided with a nut 10, for the purpose of locking fast the nonius member to the ruler. 12 is a double armed lever, whose arms are of different lengths, which is pivoted on the jaw 3 by means of a pin 13 riveted fast to the lever, which pin lies in a slot 14 at the edge of the jaw 3. The shorter arm of the lever is pivotally attached to the nonius member 7 by means of a pin 15 riveted fast to the said member, which pin lies in a slot 16 at the edge of the nonius member. The pins 13 and 15 are arranged close to each other and possess a head or disk 17 in common. The longer arm of the lever 12, is, by means of a pin 18 pivotally attached to a rod 19 which moves rectilinearly in a groove 20 in the nonius member for which purpose there are riveted fast two pins 21 on the under side of the rod 19 which two pins have their head 22 in common, which head moves in the said groove 20 which is so shaped that the said head 22 can be taken out only at that end of the groove which is provided with a larger opening 23. The rod 19 is provided on the edges with nonius scales which coact with the nonius scales on the nonius member 7 and form the principal scales for them. By means of the rod 19 the displaceable jaw 3 is regulated and the measurements can be read off. This rod permits of a convenient and rapid adjustment by hand of the jaw 3 relative to the nonius member. The nonius member has a cut or slit 24 by means of which its part which is provided with the slot 16 is made elastic and rests yieldingly against the pin 15. The rotatory movement of the lever 12 is limited in the one direction by the stop pin 25 on the jaw 3, and, in the other direction by means of the catching of the head 22 against the end wall of the groove 20. The lever 12 is also provided with a screw 26 which can be screwed into a hole 27 on the jaw 3 for the purpose of locking the lever fast in an intermediate position.

When the measuring-instrument is to be employed the nonius member 7 is released by rotating the nut 10. The lever 12 is locked fast by screw 26 in the intermediate position shown in Fig. 1. The jaw 3 which is thus locked fast to the nonius member is displaced to a certain position in which the nonius member is locked fast by means of rotating the nut 10. The jaw 3 is released from the nonius member by the rotation of the screw 26, and is displaced by the action of the rod 19, which turns lever 12 on the pivot 15 and thus moves jaw 3 by pin 13 in slot 14 up to the final reading-off position, where the reading off of the measurements can take place by means of the scales on the ruler on the nonius member and on the rod 19. If the scale on the ruler is, for example, a millimeter scale it will be possible, by means of the nonius member to read off tenths of a millimeter, and, by means of the rod 19 to read off hundredths of a millimeter.

The present invention can, of course, be varied in one respect or another without departing from the idea which forms the basis of the invention.

What I claim is:

1. A measuring instrument which has a ruler provided with a scale and a jaw displaceable along the said ruler and a nonius member which is displaceable together with the said jaw for the purpose of reading off the displacement of the jaw in common with the nonius member, in relation to which member the jaw has also a movement in the longitudinal direction of the ruler which relative movement can, by means of an auxiliary member be read off enlarged, characterized by this auxiliary member (19) which has a movement governed on the nonius member (7) being pivotally attached to the longer arm of a double armed lever (12) pivoted on the jaw (3), the shorter arm of which said lever is pivotally attached to the nonius member (7).

2. A measuring-instrument according to claim 1 said auxiliary member (19) being provided with a nonius.

3. A measuring-instrument according to claims 1 and 2 characterized by the jaw (3) and the nonius member (19) being arranged in such a way that they can be locked fast to each other in a certain position of displacement relative to each other.

4. A measuring-instrument according to claims 1–3 characterized by the jaw (3) and the nonius member (19) being connected with the lever (12) by means of two pins (13, 15) firmly attached to the lever, each of which pins lies in its proper edge-slot (14, 16) in the jaw and nonius member and which pins on the opposite side toward the lever have a common or independent head (17).

5. A measuring-instrument according to claim 4 characterized by that end of the nonius member (7) which is provided with a slot (16) which rests yieldingly against the pin (15).

6. A measuring-instrument according to claim 5 characterized by the nonius member (7) being in part cut or slit (at 24) for the purpose of forming the yielding part.

7. A measuring-instrument according to claim 6 and with a rod or the like (4) for measuring depths, which is attached to the displaceable jaw, and which is displaceable along the ruler and is governed by the latter, characterized by the rod (4) being firmly attached to the jaw (3) and forming the governing body for the latter along the ruler (1) so that the jaw (3) does not need any other special governing, and so that the jaw (3) and the rod (4) have the auxiliary member (19) common for the purpose of reading off the measurements.

In testimony whereof I have signed my name to this specification.

JOHAN SWARTZ.